Oct. 25, 1949.  J. L. ENTWISTLE  2,485,871
INSULATED ELECTRIC WIRE TESTING
Filed March 20, 1945
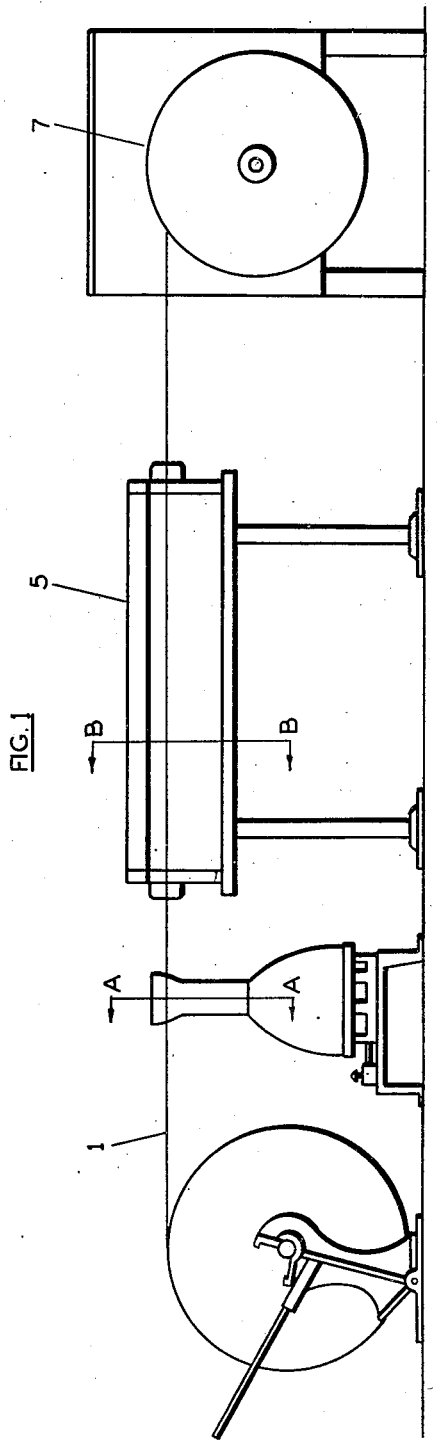
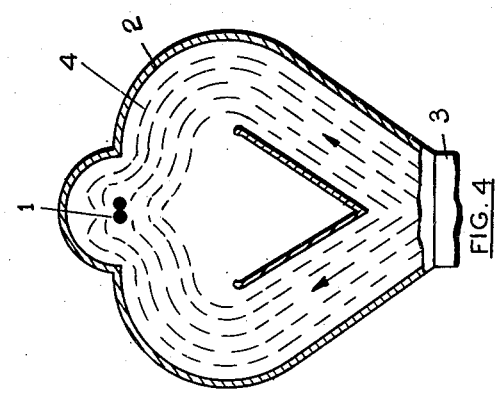
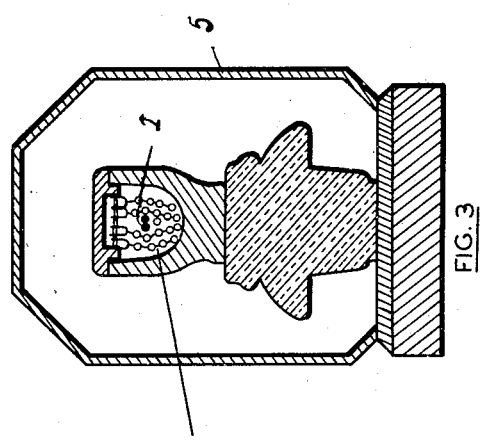
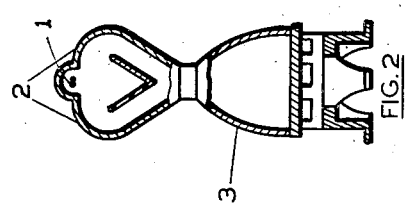

Patented Oct. 25, 1949

2,485,871

UNITED STATES PATENT OFFICE 2,485,871

INSULATED ELECTRIC WIRE TESTING

James L. Entwistle, Cranston, R. I., assignor to James L. Entwistle Co., Pawtucket, R. I., a partnership consisting of Margherita C. Entwistle and James L. Entwistle Application March 20, 1945, Serial No. 583,766

2 Claims. (Cl. 175—183)

This invention relates to new and useful improvements in apparatus and method of testing insulated electric wires, and particularly multi-conductor cords.

The object of the invention is to make possible the application of lower than customary test potential to the insulation of multi-conductor cords with greater efficiency than was heretofore practicable.

In the customary testing arrangement, the cord is moved through an electrode unit where the required test potential is applied to the surface of the cord by electrodes conststing of bead chains or the like which conform, more or less, to the circumference of the cord. Since, however, in a multi-conductor cord there are portions of the surface of one strand that are touching that of another, it is obvious that the electrode beads cannot make a contact at these points of adjacency. This makes testing at relatively low voltages inefficient.

In order to overcome this difficulty in low voltage testing, according to the present invention, the conductivity of the cord surface from a point where the electrode beads can contact the cord to a point where it cannot, is increased, whereby testing at relatively low voltages can be practiced.

In accordance with the present invention, the conductivity of the surface of the cord is increased by passing the cord at a point adjacent to its entrance into the electrode unit between nozzles of an atomizer which produces a mist of atomized water particles which adhere to the surface of the cord. The atmosphere surrounding the cord at this interval must be such that it will produce a dampness on the cord surface sufficiently great to produce the necessary conductivity but no greater than will dry enough after passing out of the electrode unit to permit winding on a take-up reel. Otherwise, the moist cord might become moldy on the take-up reel. As it passes through the electrode unit those portions of the cord that are inaccessible to direct electrode bead contact are nevertheless connected to an accessible portion by a conductive dampness on the cord surface that allows the test potential to pick up insulation faults at these points.

The embodiment of the invention is shown in the drawing in which:

Fig. 1 is a somewhat diagrammatic side elevation of a machine on which the process could be practiced;

Fig. 2 is a sectional view of the atomizer;

Fig. 3 is an enlarged section along lines B—B of Fig. 1; and

Fig. 4 is an enlarged section along lines A—A of Fig. 1.

I is the multi-conductor cord which is moved between two nozzles 2 of an atomizing unit 3. Within a few inches from its point of emergence from the nozzles 2 which project a mist 4 on the cord, the latter passes within the electrode unit 5 where the testing potential is applied through bead chains 6 surrounding the cord. A low voltage source of potential may be connected to bead chains 6, some of which are always in contact with cord I. The customary relay or other indicating device may be connected to the conductors within cord I so that when potential is applied between the surface of the cord and the conductor a break or leak in the insulation of the cord will be indicated by operation of the relay. Some distance from its point of emergence from the electrode unit 5, the cord is wound on a take-up reel 7.

In an atomizing unit, like 3, water is mechanically broken up into small particles and sprayed at room temperature. Such a device permits the production of a conductive dampness on the cord surface without the necessity of actually wetting the cord or projecting steam thereon, both of which would be detrimental to satisfactory operation. The cord will emerge dry from the electrode unit and can be immediately wound on the take-up reel 7.

While the invention has been described and illustrated as applied to multi-conductor cords, it is applicable also to a single conductor cord, the insulatiion of which is thin enough to require low testing voltages, where the potential drop to a mid-point between adjacent points of contact between the cord insulation and the beads of the electrode is appreciable. It may be of advantage to produce a conductive dampness on the surface of such cords.

What I claim is:

1. In a device for testing and winding up an electrical conductor cable covered with insulation, two nozzles positioned on opposite sides of the cable for covering the entire surface of the insulating material with a fine spray of water, means for applying potentials to the insulation, an electrode unit adjacent said nozzles through which the conductor passes and wherein a testing voltage is applied between the dampened insulation and conductor, and a take-up reel adjacent the electrode unit which pulls the conductor successively through the space between the nozzles and the electrode unit.

2. In a device for testing and winding up an insulated multiconductor cable, two atomizer nozzles positioned on opposite sides of the cable for producing a mist of water particles that dampen the surface of the conductor, means for applying a potential to the surface of the conductor, an electrode unit adjacent said nozzles through which the conductor passes and wherein a testing voltage is applied between the dampened surface and the conductor, and a take-up reel adjacent the electrode unit which pulls the conductor successively through the space between the nozzles and the electrode unit.

JAMES L. ENTWISTLE.

REFERENCES CITED

The following references are of record in the file of this patent:

UNITED STATES PATENTS

| Number | Name | Date |
|--------|------|------|
| 687,517 | Clark et al. | Nov. 26, 1901 |
| 1,013,056 | Powney | Dec. 26, 1911 |
| 2,103,134 | Akahira | Dec. 21, 1937 |

OTHER REFERENCES

General Electric Review, Nov. 1944, pages 38 and 39.